United States Patent
Bohn et al.

(10) Patent No.: US 8,451,601 B2
(45) Date of Patent: *May 28, 2013

(54) DOUBLE HINGE AXIAL CAMS

(75) Inventors: David D. Bohn, Fort Collins, CO (US); Paul M. O'Brien, Sammamish, WA (US); Christopher Bramley Fruhauf, San Anselmo, CA (US); Michael J. Basha, Brisbane, CA (US)

(73) Assignee: Microsoft Corporation, Redmond, WA (US)

( * ) Notice: Subject to any disclaimer, the term of this patent is extended or adjusted under 35 U.S.C. 154(b) by 189 days.

This patent is subject to a terminal disclaimer.

(21) Appl. No.: 13/017,460

(22) Filed: Jan. 31, 2011

(65) Prior Publication Data

US 2012/0194972 A1    Aug. 2, 2012

(51) Int. Cl.
| | |
|---|---|
| *G06F 1/16* | (2006.01) |
| *H04M 1/00* | (2006.01) |
| *E05D 3/06* | (2006.01) |
| *E05D 11/06* | (2006.01) |
| *E05D 1/08* | (2006.01) |
| *E05D 11/10* | (2006.01) |

(52) U.S. Cl.
USPC .......... 361/679.55; 361/679.56; 361/679.26; 361/679.27; 455/575.1; 455/575.3; 16/366; 16/371; 16/286; 16/334; 16/335

(58) Field of Classification Search
USPC ............. 361/679.01–679.45, 679.55–679.59; 345/156, 157, 168, 169, 905; 455/575.1, 455/575.3, 575.4; 16/221, 227, 233, 366, 16/371, 286, 334, 335
See application file for complete search history.

(56) References Cited

U.S. PATENT DOCUMENTS

| | | |
|---|---|---|
| 4,050,116 A | 9/1977 | Salice |
| 4,949,426 A | 8/1990 | Komaki |
| 5,052,078 A | 10/1991 | Hosoi |
| 5,077,551 A | 12/1991 | Saitou |
| 5,661,797 A | 8/1997 | Leman et al. |
| 6,108,868 A | 8/2000 | Lin |
| 6,230,365 B1 | 5/2001 | Lu |
| 6,388,872 B1 | 5/2002 | Liao et al. |
| 6,553,625 B2 | 4/2003 | Lin et al. |
| 7,054,147 B2 | 5/2006 | Maatta et al. |

(Continued)

OTHER PUBLICATIONS

"Fpc (Mobile Phone Flex Cable)", Retrieved from: <http://richli.en.made-in-china.com/product/FeBEzQgvHJic/China-Fpc-Mobile-Phone-Flex-Cable-.html> on Oct. 11, 2010, 1 page.

(Continued)

*Primary Examiner* — Jayprakash N Gandhi
*Assistant Examiner* — Nidhi Desai
(74) *Attorney, Agent, or Firm* — Wolfe-SBMC

(57) ABSTRACT

In embodiments of double hinge axial cams, a portable device includes a first housing integrated with a display device, and a second housing movably coupled to the first housing. The first housing is operable to open and close relative to the second housing, and the first and second housings can be rotated from a closed position at approximately zero degrees (0°) to an open position at approximately one-hundred and eighty degrees (180°), as well as rotated through approximately three-hundred and sixty degrees (360°). Double hinges are operable to movably couple the first housing and the second housing. The double hinges include axial cams that apply a holding torque in the open position that resists the first and second housings closing.

20 Claims, 4 Drawing Sheets

U.S. PATENT DOCUMENTS

| | | |
|---|---|---|
| 7,058,433 B2 | 6/2006 | Carpenter |
| 7,155,266 B2 | 12/2006 | Stefansen |
| 7,155,780 B2 | 1/2007 | Chen |
| 7,266,864 B2 | 9/2007 | Kim |
| 7,374,424 B1 | 5/2008 | Nurmi et al. |
| 7,414,834 B2 * | 8/2008 | Ukonaho et al. ......... 361/679.55 |
| 7,515,707 B2 * | 4/2009 | Ka et al. .................... 379/433.12 |
| 7,596,832 B2 | 10/2009 | Hsieh et al. |
| 7,738,930 B2 * | 6/2010 | Petrella ....................... 455/575.3 |
| 7,787,912 B2 | 8/2010 | Saila |
| 7,930,803 B2 * | 4/2011 | Ueyama et al. ................. 16/366 |
| 2001/0003707 A1 | 6/2001 | Moriya |
| 2002/0069483 A1 | 6/2002 | Savolainen et al. |
| 2004/0077199 A1 | 4/2004 | Winstead et al. |
| 2004/0209641 A1 | 10/2004 | Hong |
| 2005/0079900 A1 | 4/2005 | Li |
| 2006/0080805 A1 | 4/2006 | Takagi |
| 2006/0171529 A1 | 8/2006 | Iikura |
| 2006/0185122 A1 | 8/2006 | Saito et al. |
| 2006/0198513 A1 | 9/2006 | Eldon |
| 2006/0246964 A1 | 11/2006 | Castaneda et al. |
| 2007/0000088 A1 | 1/2007 | Mao et al. |
| 2007/0054710 A1 * | 3/2007 | Pan ............................ 455/575.3 |
| 2007/0107163 A1 | 5/2007 | Barnett |
| 2008/0307608 A1 * | 12/2008 | Goto ................................ 16/366 |
| 2009/0000062 A1 * | 1/2009 | Yamanami ...................... 16/366 |
| 2009/0147458 A1 | 6/2009 | Wang et al. |
| 2009/0151118 A1 | 6/2009 | Karkkola et al. |
| 2009/0156260 A1 | 6/2009 | Derengowski et al. |
| 2009/0227301 A1 | 9/2009 | Lindvall |
| 2009/0265890 A1 | 10/2009 | Endo et al. |
| 2009/0291719 A1 | 11/2009 | Christensen |
| 2010/0071155 A1 | 3/2010 | Ueyama et al. |
| 2010/0232096 A1 | 9/2010 | Chen |
| 2010/0304799 A1 | 12/2010 | Leung et al. |
| 2011/0265288 A1 * | 11/2011 | Chiang ............................ 16/341 |
| 2012/0147535 A1 * | 6/2012 | Ahn et al. ................. 361/679.01 |
| 2012/0162866 A1 | 6/2012 | Bohn |
| 2012/0206864 A1 | 8/2012 | Bohn |
| 2012/0206893 A1 | 8/2012 | Bohn |
| 2012/0257368 A1 | 10/2012 | Bohn |

OTHER PUBLICATIONS

Ruhfass, Michelle "Review: Samsung's Double Jointed SCH-u740", Retrieved from: <http://www.mobileburn.com/review.jsp?Id=3188> on Oct. 27, 2010, (Mar. 1, 2007), 2 pages.

Kelander, et al., "Modeling for High-Speed Interconnects in Mobile Device Hinge Structures", Retrieved at << http://ieeexplore.ieee.org/stamp/stamp.jsp?tp=&arnumber=4060770 >>, 1st Electronics Systemintegration Technology Conference, Sep. 5-7, 2006, pp. 485-490.

Falcone, Joe., "Microminiature Connector Solutions for Wireless Handheld Devices", Retrieved at << http://www.ecnmag.com/Products/2009/08/Microminiature-Connector-Solutions-for-Wireless-Handheld-Devices/ >>, Aug. 21, 2009, pp. 5.

Wattanajantra, Asavin., "Fujitsu dual-touchscreen concept phone will have you feeling double", Retrieved at << http://crave.cnet.co.uk/mobiles/fujitsu-dual-touchscreen-concept-phone-will-have-you-feeling-double-50001064/ >>, Oct. 7, 2010, pp. 11.

Bohn, et al., "Double Hinge Axial Claims", U.S. Appl. No. 13/017,460, filed Jan. 31, 2011, pp. 1-17.

Bohn, et al., "Double Hinge Torsion Bar", U.S. Appl. No. 13/027,021, filed Feb. 14, 2011, pp. 1-18.

Bohn, et al., "Double Hinge Radial Claims", U.S. Appl. No. 12/978,162, filed Dec. 23, 2010, pp. 1-16.

Bohn, et al., "Hinge Electrical Interconnection Guide", U.S. Appl. No. 13/024,506, filed Feb. 10, 2010, pp. 1-19.

"Non-Final Office Action", U.S. Appl. No. 13/084,284, (Dec. 12, 2012), 20 pages.

"Notice of Allowance", U.S. Appl. No. 12/978,162, (Nov. 30, 2012), 12 pages.

* cited by examiner

DOUBLE HINGE AXIAL CAMS

BACKGROUND

Mobile phones and portable devices are increasingly common, and many include dual displays and/or a display device that opens and closes relative to a handheld base of a device. For example, a mobile computer device can be hinged to open two display devices, each integrated into a side or half of the device housing. However, hinge mechanisms can include relatively complex rotating hinges and hardware components to position the display screens for use. Hinge mechanisms can also be obtrusive when configured between display devices and/or may take up space that would otherwise be utilized to implement a larger display device. Users typically want the smallest possible devices to conveniently carry in a pocket or purse, but also want devices with larger display surfaces.

SUMMARY

This summary is provided to introduce simplified concepts of double hinge axial cams that is further described below in the Detailed Description. This summary is not intended to identify essential features of the claimed subject matter, nor is it intended for use in determining the scope of the claimed subject matter.

Double hinge axial cams are described. In embodiments, a portable device includes a first housing integrated with a display device, and a second housing movably coupled to the first housing. The first housing is operable to open and close relative to the second housing, and the first and second housings can be rotated from a closed position at approximately zero degrees (0°) to an open position at approximately one-hundred and eighty degrees (180°), as well as rotated through approximately three-hundred and sixty degrees (360°). Double hinges are operable to movably couple the first housing and the second housing. The double hinges include axial cams that apply a holding torque in the open position that resists the first and second housings closing.

In other embodiments, the second housing of the portable device is integrated with an additional display device, and the display device and the additional display device can be positioned adjacent each other as a surface display in the open position of the first and second housings. Correspondingly, the display devices are viewable from opposite sides of the portable device in the closed position of the first and second housings (also referred to herein as an anti-book mode). A double hinge includes a hinge link that couples the axial cams, and the hinge link is designed for installation into the first and second housings of the portable device. The axial cams each include a cam and a cam follower. One of the cams is integrated with the hinge link and the second cam is removable from the hinge link. The second cam can be assembled into the hinge link after the hinge link is installed into the first and second housings of the portable device.

In other embodiments, the double hinge is operable with a first actuation and a second actuation to sequence opening the first and second housings, and to reverse-sequence closing the first and second housings. The axial cams of the double hinge include cam-and-follower mechanisms, one of which opens a first half of the double hinge with less applied torque before a second half of the double hinge opens, and closes the first half of the double hinge before the second half of the double hinge closes. A cam face of one of the cam followers has a different shape than the other cam follower, and the different shape of the cam follower is operable on a cam to apply less torque.

BRIEF DESCRIPTION OF THE DRAWINGS

Embodiments of double hinge axial cams are described with reference to the following drawings. The same numbers are used throughout the drawings to reference like features and components.

DETAILED DESCRIPTION

Double hinge axial cams are described. In embodiments, the double hinge allows a portable device, such as mobile phone or computer device, with two housing sections to open to a flat position. The axial cams are oriented for axial actuation, and can be implemented for a friction/detent motion or for an overcenter/bistable motion. The double hinge is operable to open and close a first housing of a device relative to a second housing of the device, and the housing sections can be rotated from a closed position at approximately zero degrees (0°) to an open position at approximately one-hundred and eighty degrees (180°). A double hinge may also be operable to rotate the housing sections of the portable device approximately three-hundred and sixty degrees (360°) relative to each other. The axial cams of the double hinge apply a holding torque in the open position that resists the housings closing, such as from a touch input to a display device. Additionally, the double hinges can be installed in a device and hidden from view with the hinge mechanisms installed under the display devices, which also allows that a device can be designed thinner.

While features and concepts of the described systems and methods for double hinge axial cams can be implemented in any number of different environments, systems, devices, and/or various configurations, embodiments of double hinge axial cams are described in the context of the following example devices, systems, and configurations.

Figure 1:
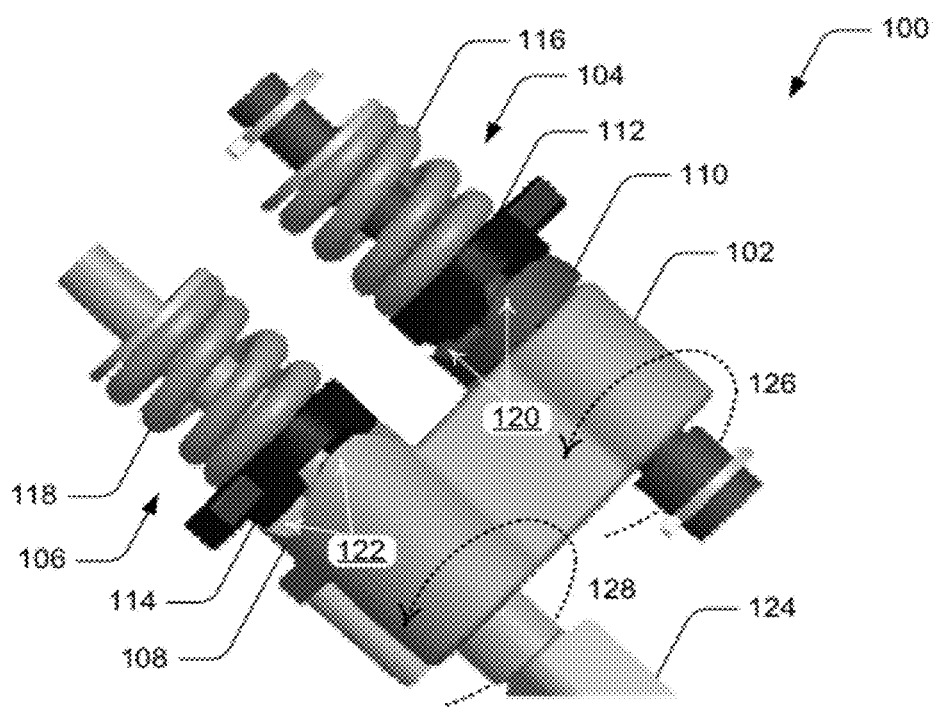
FIG. 1 illustrates an example of double hinge axial cams in accordance with one or more embodiments.

FIG. 1 illustrates an example of double hinge axial cams 100 in accordance with embodiments described herein. The double hinge axial cams include a hinge link 102, as well as two cam-and-follower mechanisms 104, 106. The hinge link has an integrated cam 108 (e.g., molded or constructed as an integral component of the hinge link), and has a removable cam 110 (e.g., keyed to lock in position relative to the hinge link when installed). The first cam-and-follower mechanism 104 includes a cam follower 112 and the removable cam 110. Similarly, the second cam-and-follower mechanism 106 includes a cam follower 114 and the integrated cam 108. The first cam-and-follower mechanism 104 also includes a tensioner spring 116, and the second cam-and-follower mechanism 106 includes a tensioner spring 118. The tensioner springs apply a force to push the respective cam followers against cam lobes of the corresponding axial cams. The cam followers 112, 114 have stops that hold them in a fixed position relative to the respective cams 110, 108 as the hinge link rotates.

The removable cam 110 has cam lobes 120 that actuate against the first cam follower 112. Similarly, the integrated cam 108 has cam lobes 122 that actuate against the second cam follower 114. In an implementation, each of the cams are balanced with three cam lobes evenly spaced every one-hundred and twenty degrees (120°). A force vector having a force and a direction of the force is created where a cam lobe contacts a cam follower, and the shape of the cam and the cam follower change the force vector and the applied torque. In an alternate embodiment, the double hinge can be implemented as a friction hinge, and the cam-and-follower mechanisms are operable to actuate based on friction between a cam and a cam follower. A torsion bar 124 couples the hinge link 102 to a second hinge link (not shown), such as when two of the double hinge axial cams are installed in a portable device (e.g., on opposite ends or sides of the portable device). The double hinge can be implemented as a bistable hinge mechanism that is operable with a first actuation at 126 and a second actuation at 128 to sequence closing, and is then operable to reverse-sequence when opening.

The first cam-and-follower mechanism 104 closes the first half of the double hinge (e.g., at 126) with less applied torque before the second cam-and-follower mechanism 106 closes the second half of the double hinge (e.g., at 128). The first cam-and-follower mechanism 104 also opens the first half of the double hinge with less applied torque before the second cam-and-follower mechanism 106 opens the second half of the double hinge. In an implementation, a cam face of the first cam follower 112 is a different shape than the second cam follower 114, and the shape difference of the cam face is operable on the cam 110 to apply less torque. The sequence of opening the double hinge, and the reverse-sequencing of closing the double hinge, is further described with reference to the torque chart shown in FIG. 3.

Figure 2:
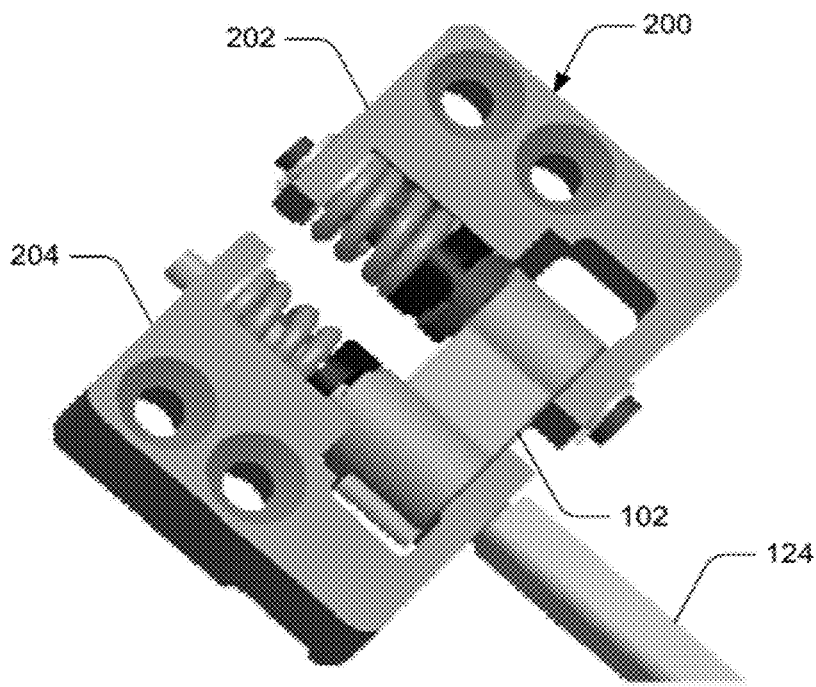
FIG. 2 illustrates another example of the double hinge axial cams in accordance with one or more embodiments.

FIG. 2 further illustrates the double hinge axial cams in accordance with embodiments described herein. The double hinge axial cams 100 shown in FIG. 1 are installed in a hinge chassis 200, and hinge components described with reference to FIG. 1 are identified in FIG. 2. The hinge chassis is shown in an open position and has a first half 202 and a second half 204, both designed to attach to housing sections of a portable device, such as a portable computer or mobile phone. For example the first half 202 of the hinge chassis attaches to a first housing of a portable device, and the second half 204 of the hinge chassis attaches to a second housing of the portable device. The double hinge axial cams are then operable to open and close the first and second housings of the portable device relative to each other from a closed position at approximately zero degrees (0°) to an open position at approximately one-hundred and eighty degrees (180°). The double hinge axial cams may also be implemented to rotate the housing sections of the portable device approximately three-hundred and sixty degrees (360°) relative to each other.

Figure 3:
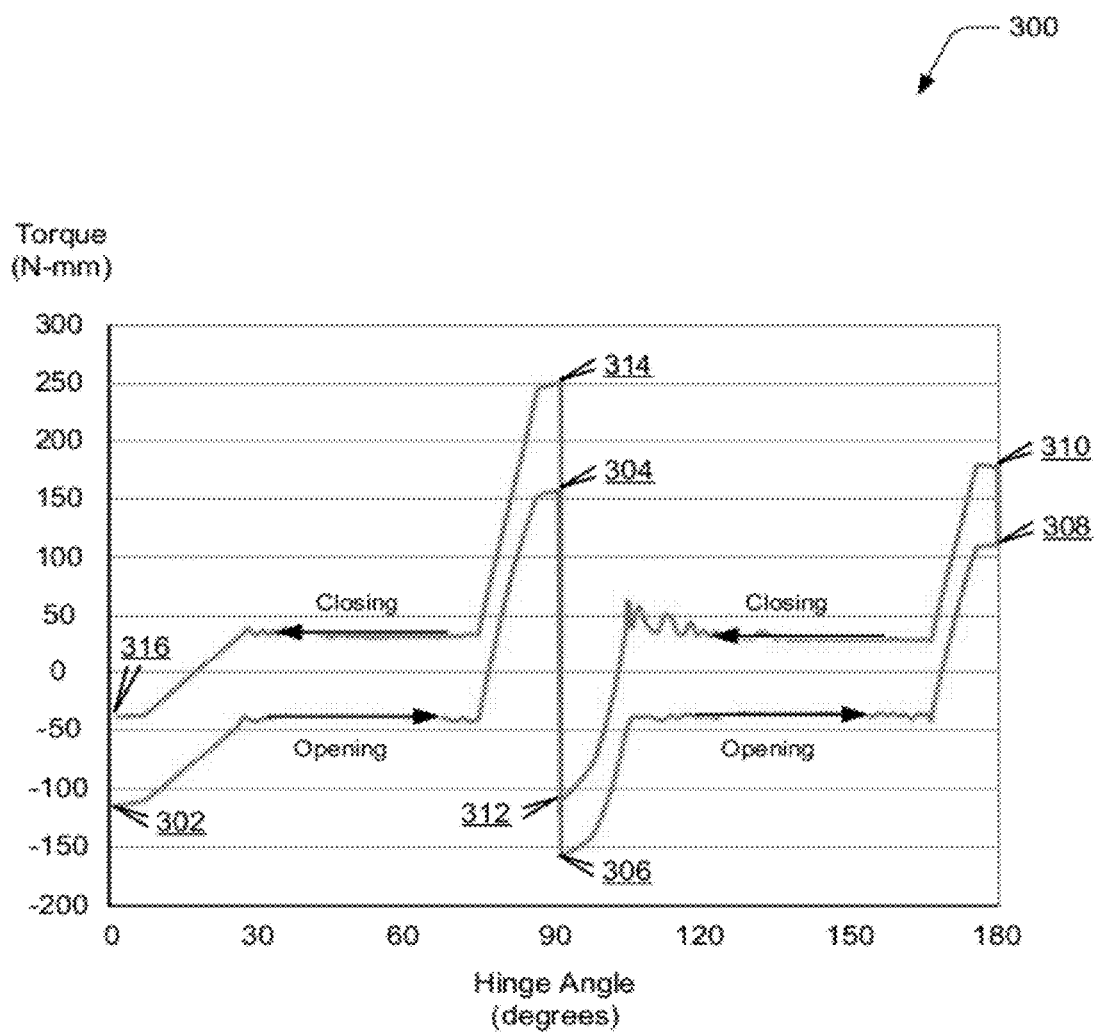
FIG. 3 illustrates a torque chart for double hinge axial cams in accordance with one or more embodiments.

FIG. 3 illustrates a torque chart 300 for double hinge axial cams in accordance with embodiments described herein. The torque chart illustrates the torque (in Newton-millimeters) as the double hinge is opened from a closed position at a hinge angle of zero degrees (0°) to an open position at a hinge angle of one-hundred and eighty degrees (180°), and then back to the closed position at the hinge angle of zero degrees (0°). The portable device is closed at 302 (hinge angle 0°), and a force is applied to begin opening the first and second housings of the device relative to each other. Between approximately thirty degrees (30°) and eighty degrees (80°), the axial cams are designed to provide a smooth, consistent open torque, and then the device opens by itself to a first detent at 304 (hinge angle 90°). When a force is again applied (torque between 304 and 306), the first and second housings continue opening at 306. Between approximately one-hundred and twenty degrees (120°) and one-hundred and seventy degrees (170°), the axial cams are designed to again provide a smooth, consistent open torque, and then the device opens by itself to a second detent at 308 (hinge angle 180°).

In the open position at 308, the axial cams of the double hinge apply the holding torque that resists the first and second housings closing responsive to a touch input to a display device implemented as a touch-screen display. When a force is again applied (torque between 308 and 310), the first and second housings begin reverse-sequence closing relative to each other. Between approximately one-hundred and seventy degrees (170°) and one-hundred and twenty degrees (120°), the axial cams provide a smooth, consistent close torque, and then the device closes by itself to the detent at 312 (hinge angle 90°). When a force is again applied (torque between 312 and 314), the first and second housings continue closing at 314. Between approximately eighty degrees (80°) and thirty degrees (30°), the axial cams are designed to again provide a smooth, consistent close torque, and then the device closes by itself to the detent at 316 (hinge angle 0°).

Figure 4:
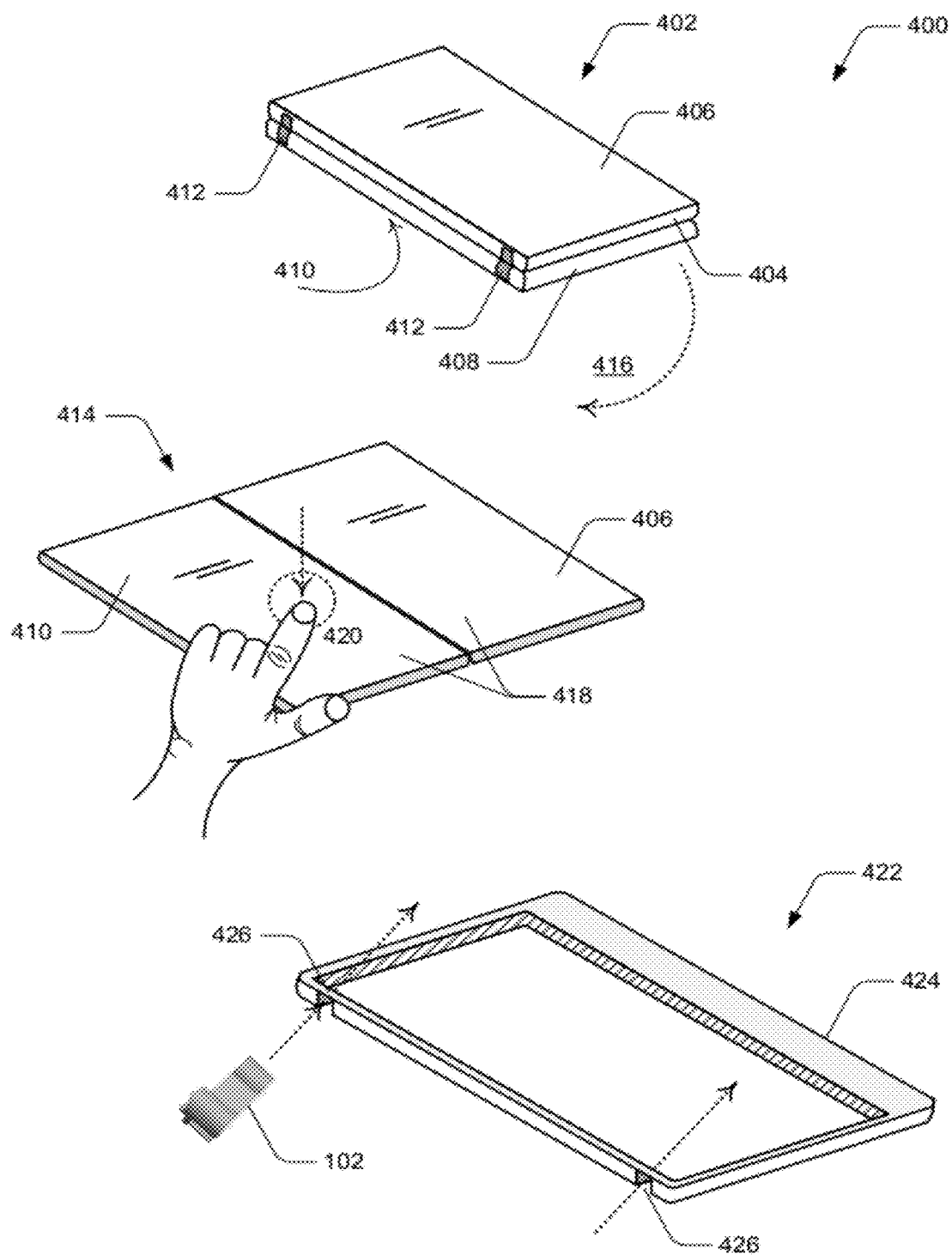
FIG. 4 illustrates an example of a portable device implemented with double hinge axial cams in accordance with one or more embodiments.

FIG. 4 illustrates examples of a portable device 400 that can be implemented to include double hinge axial cams in accordance with embodiments described herein. In embodiments, the portable device may be any form of a consumer, computer, user, communication, phone, navigation, television, appliance, gaming, media playback, and/or electronic device. In a first view 402, the portable device 400 is shown in a closed position. The portable device 400 has a first housing 404 with an integrated display device 406, and also has a second housing 408 that may include a physical keyboard or an additional display device 410 (e.g., on the underside of the portable device as shown in this example). Correspondingly, the display devices are viewable from opposite sides of the portable device in the closed position of the first and second housings (also referred to herein as an anti-book mode).

The first housing 404 is movably coupled to the second housing 408 by the double hinge axial cams 412, installed in the device between the display devices and operable to open from the closed position at approximately zero degrees (0°) to an open position at approximately one-hundred and eighty degrees (180°), as well as rotated through approximately three-hundred and sixty degrees (360°). In a second view 414, the portable device 400 is shown in the open position, such as when the second housing 408 is rotated around and up at 416 to position the display device 406 and the additional display device 410 adjacent each other to form a surface display 418 (e.g., the two display devices appear as one larger display surface). In the open position, the double hinge axial cams are not visible, and are designed to allow the display devices coming together in the open position.

In embodiments, the double hinge axial cams 412 apply a holding torque in the open position that resists the first and second housings closing responsive to a touch input 420 to the display device. For example, one or both of the display devices may be integrated touch-screen displays, and the touch input 420 to the touch-screen is a directional force that the axial cams resist to hold the first and second housings of the portable device in the open position.

In a third view 422, an outer casing 424 of the second housing 408 is shown to illustrate an installation feature of the double hinge axial cams 412 into the first and second housings of the portable device. The casing of the second housing has hinge slots 426 through which each of the hinge links 102 are inserted before being attached to the other half of the double hinge (that is then attached to the first housing). Referring the FIG. 1, the removable cam 110 is designed for installation into the hinge link 102 after the hinge link is installed into the first and second housings of the portable device. This facilitates a narrower hinge slot 426, which is just wide enough to accommodate the width of the hinge link, rather than the combined width of both the hinge link and the cam. The narrower slots in the casing of the housing are more resistant to debris intrusion into the portable device, and the smaller or narrower hinge slots better maintain the structural integrity of the housing.

Figure 5:
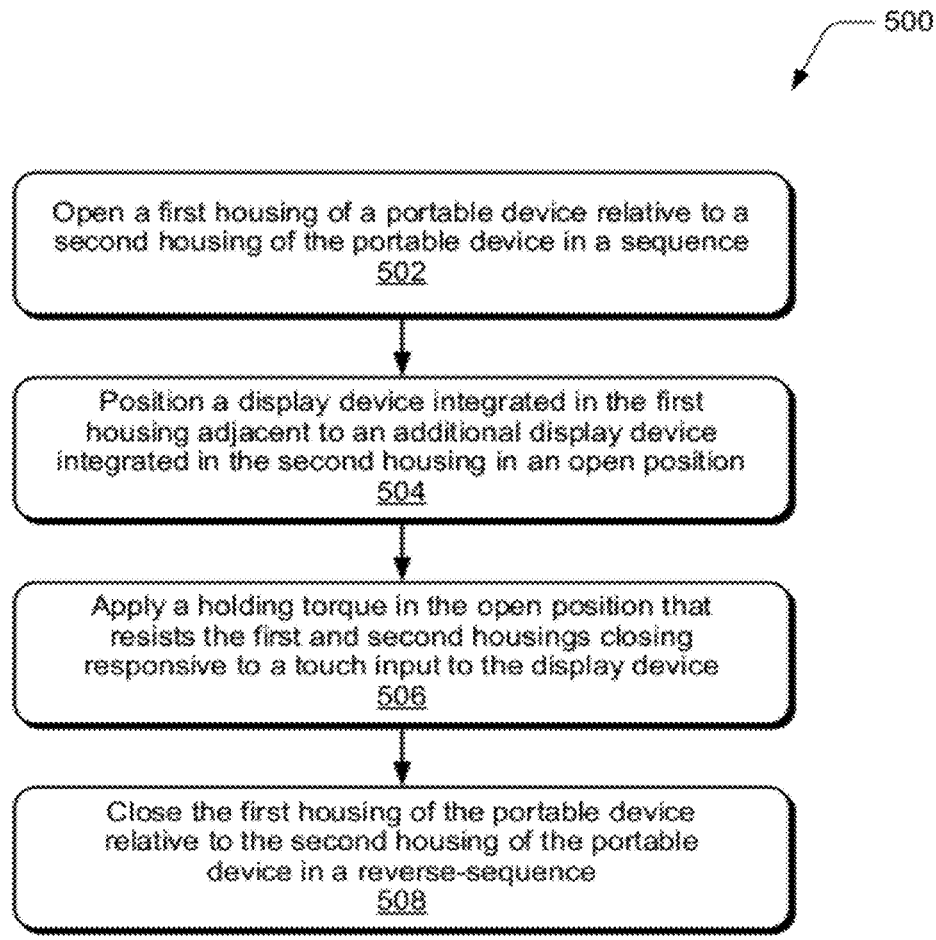
FIG. 5 illustrates example method(s) of double hinge axial cams in accordance with one or more embodiments.

FIG. 5 illustrates example method(s) 500 of double hinge axial cams. The order in which the method blocks are described are not intended to be construed as a limitation, and any number of the described method blocks can be combined in any order to implement a method, or an alternate method.

At block 502, a first housing of a portable device is opened relative to a second housing of the portable device in a sequence. For example, the double hinge axial cams 412 (FIG. 4) open the first housing 404 of the portable device 400 relative to the second housing 408 of the portable device in a sequence. The first and second housings are operable to open and close relative to each other from a closed position at approximately zero degrees (0°) to an open position at approximately one-hundred and eighty degrees (180°), as well as rotated through approximately three-hundred and sixty degrees (360°). The sequence to open the first and second housings relative to each other include a first half of a double hinge opening with less applied torque before a second half of the double hinge opens. In an implementation, less torque is applied to a cam-and-follower mechanism of the first half of the double hinge to sequence opening the first and second housings of the portable device. The axial cams of the double hinge are operable for a first actuation to open the first half of the double hinge before the second half of the double hinge opens.

At block 504, a display device that is integrated in the first housing of the portable device is positioned adjacent to an additional display device that is integrated in the second housing of the portable device. For example, the double hinge axial cams 412 are designed to position the display device 406 and the additional display device 410 adjacent each other to form the surface display 418 (e.g., the two display devices appear as one larger display surface) in the open position.

At block 506, a holding torque is applied in the open position that resists the first and second housings closing responsive to an input to a display device. For example, the double hinge axial cams 412 apply a holding torque in the open position that resists the first and second housings closing responsive to an input 420 to the display device. For example, one or both of the display devices may be integrated touch-screen displays, and the touch input 420 to the touch-screen is a directional force that the axial cams resist to hold the first and second housings of the portable device in the open position.

At block 508, the first housing of the portable device is closed relative to the second housing of the portable device in a reverse-sequence. For example, the double hinge axial cams 412 close the first housing 404 of the portable device 400 relative to the second housing 408 of the portable device in a reverse sequence. The reverse sequence includes the first half of the double hinge closing before the second half of the double hinge closes. Less torque is applied to the cam-and-follower mechanism of the first half of the double hinge to reverse-sequence closing the first and second housings of the portable device. The axial cams of the double hinge are operable for a second actuation to close the first half of the double hinge before the second half of the double hinge closes.

Although embodiments of double hinge axial cams have been described in language specific to features and/or methods, the subject of the appended claims is not necessarily limited to the specific features or methods described. Rather, the specific features and methods are disclosed as example implementations of double hinge axial cams.

The invention claimed is:

1. A portable device, comprising: a first housing integrated with a display device; a second housing movably coupled to the first housing, which is operable to open and close relative to the second housing, the first and second housings configurable from a closed position at approximately zero degrees (0°) to an open position at approximately one-hundred and eighty degrees (180°); a double hinge operable to movably couple the first housing and the second housing, the double hinge comprising axial cams configured to apply a holding torque in the open position that resists the first and second housings closing; the axial cams of the double hinge comprising cam-and-follower mechanisms, one of which opens a first half of the double hinge with less applied torque before a second half of the double hinge opens, and closes the first half of the double hinge before the second half of the double hinge closes; and a cam face of a first cam follower comprising a different shape than a second cam follower, the cam face operable on an axial cam to apply the less applied torque.

2. A portable device as recited in claim 1, wherein the second housing is integrated with an additional display device, and wherein the display device and the additional display device are configurable adjacent each other as a surface display in the open position.

3. A portable device as recited in claim 2, wherein the display devices are viewable from opposite sides of the portable device in the closed position of the first and second housings.

4. A portable device as recited in claim 1, wherein the double hinge is operable with a first actuation and a second actuation to sequence opening the first and second housings, and further operable to reverse sequence closing the first and second housings.

5. A portable device as recited in claim 4, wherein the double hinge is operable as a bistable mechanism said opening the first and second housings, and said closing the first and second housings.

6. A portable device as recited in claim 1, wherein the double hinge is configured as a friction hinge that comprises the cam-and-follower mechanisms operable to actuate based on friction between a cam and a cam follower.

7. A portable device as recited in claim 1, wherein: the double hinge comprises a hinge link configured to couple the axial cams, the hinge link further configured for installation into the first and second housings of the portable device; the axial cams each comprise a cam and a cam follower, a first cam integrated with the hinge link and a second cam configured removable from the hinge link; and the second cam further configured for installation in the hinge link after the hinge link is installed into the first and second housings of the portable device.

8. A double hinge, comprising: a hinge chassis configured for attachment to a first housing of a portable device and a second housing of the portable device, the first and second housings operable to open and close relative to each other from a closed position at approximately zero degrees (0°) to an open position at approximately one-hundred and eighty degrees (180°); axial cams configured to apply a holding torque in the open position that resists the first and second housings closing responsive to a pressure input on a display device integrated into the first housing; the axial cams comprising cam-and-follower mechanisms, one of which opens a first half of the double hinge with less applied torque before a second half of the double hinge opens, and closes the first half of the double hinge before the second half of the double hinge closes; and a cam face of a first cam follower comprises a different shape than a second cam follower, the cam face operable on an axial cam to apply the less applied torque.

9. A double hinge as recited in claim 8, wherein the axial cams are operable for a first actuation and a second actuation to sequence opening the first and second housings, and are further operable to reverse sequence closing the first and second housings.

10. A double hinge as recited in claim 9, wherein the axial cams are operable as a bistable mechanism said opening the first and second housings, and said closing the first and second housings.

11. A double hinge as recited in claim 8, wherein the double hinge is configured as a friction hinge that comprises the cam-and-follower mechanisms operable to actuate based on friction between a cam and a cam follower.

12. A double hinge as recited in claim 8, wherein:
the double hinge further comprises a hinge link configured to couple the axial cams, the hinge link further configured for installation into the first and second housings of the portable device;
the axial cams each comprise a cam and a cam follower, a first cam integrated with the hinge link and a second cam configured removable from the hinge link; and
the second cam further configured for installation in the hinge link after the hinge link is installed into the first and second housings of the portable device.

13. A double hinge as recited in claim 8, further comprising tensioner springs each configured to apply a force to push a cam follower against a respective axial cam of the double hinge.

14. A method, comprising: opening a first housing of a portable device relative to a second housing of the portable device, the first and second housings operable to open relative to each other from a closed position at approximately zero degrees (0°) to an open position at approximately one-hundred and eighty degrees (180°); movably-coupling the first housing and the second housing with a double hinge that comprises axial cams configured for applying a holding torque in the open position that resists the first and second housings closing responsive to a pressure input on a display device integrated into the first housing, the axial cams of the double hinge comprising cam-and-follower mechanisms, one of which opens a first half of the double hinge with less applied torque before a second half of the double hinge opens, and closes the first half of the double hinge before the second half of the double hinge closes; and applying less torque to a cam-and-follower mechanism, a cam face of a first cam follower comprising a different shape than a second cam follower and the cam face operable on an axial cam to apply the less applied torque.

15. A method as recited in claim 14, further comprising: closing the first housing of the portable device relative to the second housing of the portable device; sequencing said opening the first and second housings, the sequence comprising a first half of the double hinge said opening with the less applied torque before a second half of the double hinge opens; and reverse-sequencing said closing the first and second housings, the reverse sequence comprising the first half of the double hinge said closing before the second half of the double hinge closes.

16. A method as recited in claim 15, wherein the axial cams of the double hinge are operable for a first actuation to open the first half of the double hinge before the second half of the double hinge opens, and the axial cams further operable for a second actuation to close the first half of the double hinge before the second half of the double hinge.

17. A method as recited in claim 14, wherein the first and second housings of the portable device are movably-coupled with the double hinge that is operable as a bistable mechanism said opening the first and second housings relative to each other, and closing the first and second housings relative to each other.

18. A method as recited in claim 14, wherein the first and second housings of the portable device are movably-coupled with the double hinge that is configured as a friction hinge that includes the cam-and-follower mechanisms operable to actuate based on friction between the axial cam and a cam follower.

19. A method as recited in claim 14, further comprising coupling the axial cams of the double hinge with a hinge link configured for installation into the first and second housings of the portable device.

20. A method as recited in claim 19, wherein: the first axial cam is integrated with the hinge link; and the second axial cam is configured removable from the hinge link and configured for installation in the hinge link after the hinge link is installed into the first and second housings of the portable device.

* * * * *